(12) United States Patent
Henry et al.

(10) Patent No.: US 7,844,660 B2
(45) Date of Patent: Nov. 30, 2010

(54) METHOD OF DISCOVERY OF A DOMESTIC NETWORK AND DEVICE IMPLEMENTING THE METHOD

(75) Inventors: Jean-Baptiste Henry, Melesse (FR); Jean-François Fleury, Rennes (FR)

(73) Assignee: Thomson Licensing, Boulogne Billancourt (FR)

( * ) Notice: Subject to any disclaimer, the term of this patent is extended or adjusted under 35 U.S.C. 154(b) by 945 days.

(21) Appl. No.: 10/584,644

(22) PCT Filed: Jan. 4, 2005

(86) PCT No.: PCT/EP2005/050024

§ 371 (c)(1),
(2), (4) Date: Jun. 26, 2006

(87) PCT Pub. No.: WO2005/067210

PCT Pub. Date: Jul. 21, 2005

(65) Prior Publication Data

US 2009/0019136 A1    Jan. 15, 2009

(30) Foreign Application Priority Data

Jan. 6, 2004    (FR) ................................. 04 00072

(51) Int. Cl.
*G06F 15/16* (2006.01)
(52) U.S. Cl. ....................... 709/203; 709/224; 709/228; 370/254; 370/389
(58) Field of Classification Search ................. 709/203, 709/226, 230, 225, 228, 220; 713/182; 719/330
See application file for complete search history.

(56) References Cited

U.S. PATENT DOCUMENTS

| 5,187,787 | A | * | 2/1993 | Skeen et al. ................. 719/314 |
| 6,466,549 | B1 | | 10/2002 | Hattig |
| 6,898,618 | B1 | * | 5/2005 | Slaughter et al. ............ 709/203 |
| 6,917,976 | B1 | * | 7/2005 | Slaughter et al. ............ 709/226 |
| 7,016,966 | B1 | * | 3/2006 | Saulpaugh et al. .......... 709/230 |
| 7,188,251 | B1 | * | 3/2007 | Slaughter et al. ............ 713/182 |

(Continued)

FOREIGN PATENT DOCUMENTS

CN    1322358 A    11/2001

(Continued)

OTHER PUBLICATIONS

Search Report Dated May 30, 2005.

*Primary Examiner*—Khanh Q Dinh
(74) *Attorney, Agent, or Firm*—Robert D. Shedd; Paul P. Kiel

(57) ABSTRACT

The invention relates to audio and video interoperability over networks based on network technologies other than the 1394 bus. The invention relates more particularly to a method of discovery, by a device connectable to a communication network, of the other devices connected to this network, which comprises a step of connection of the device to the said network, a step of despatching of an announcement message containing autodescription information describing the device destined for all the other devices connected to this network, a step of despatching of an autodescription information request message to all the other devices connected to this network and a step of reception of a response message from each of the other devices of the network containing the autodescription information of this other device. The invention also relates to the corresponding connectable device.

11 Claims, 5 Drawing Sheets

U.S. PATENT DOCUMENTS

| | | |
|---|---|---|
| 7,200,848 B1 * | 4/2007 | Slaughter et al. ............ 719/317 |
| 7,243,356 B1 * | 7/2007 | Saulpaugh et al. .......... 719/330 |
| 7,260,543 B1 * | 8/2007 | Saulpaugh et al. .......... 705/307 |
| 7,458,082 B1 * | 11/2008 | Slaughter et al. ............ 719/328 |
| 2002/0062366 A1 | 5/2002 | Roy et al. |
| 2002/0120672 A1 | 8/2002 | Butt et al. |
| 2006/0155802 A1 * | 7/2006 | He et al. ..................... 709/203 |

FOREIGN PATENT DOCUMENTS

| | | |
|---|---|---|
| JP | 2002-99473 | 4/2002 |
| WO | WO 00/77618 | 12/2000 |
| WO | WO 01/08151 A1 | 2/2001 |

* cited by examiner

_US 7,844,660 B2_

METHOD OF DISCOVERY OF A DOMESTIC NETWORK AND DEVICE IMPLEMENTING THE METHOD

This application claims the benefit, under 35 U.S.C. §365 of International Application PCT/EP2005/050024, filed Jan. 4, 2005, which was published in accordance with PCT Article 21(2) on Jul. 21, 2005 in English and which claims the benefit of French patent application No. 04 00072, filed Jan. 6, 2004.

1. FIELD OF THE INVENTION

Domestic audio and video Interoperability (HAVi standing for <<Home Audio Video interoperability>>) is a specification developed by mass-market electronics companies which allows the interconnection of audio and video devices in a domestic environment based on a network using the technology of IEEE 1394 buses. The current version (version 1.1, available from HAVi, Inc. 2694 Bishop Drive, Suite 275 San Ramon, Calif. 94583, USA) is not designed to operate on networks based on technologies other than the IEEE 1394 bus, whose reference is the IEEE 1394-2000 standard.

2. TECHNICAL BACKGROUND

In the current state of the market for domestic devices, it is apparent that the networks which are developed within the domestic context are generally heterogeneous and involve diverse technologies other than IEEE 1394. Mention may, for example, be made of the Importance of networks complying with the internet protocol (IP standing for <<Internet Protocol>>), a reference to which may be found in the form of a request for comments (RFC) under number RFC 791, these requests being maintained by the internet engineering task force (IETF). The HAVi specification having been designed within the context of an application on a 1394 bus, its use on a network of another technology raises the problem of its adaptation to this other technology.

3. SUMMARY OF THE INVENTION

The invention relates to audio and video interoperability over networks based on network technologies other than the 1394 bus.

The invention relates more particularly to a method of discovery, by a device connectable to a communication network, of the other devices connected to this network, which comprises a step of connection of the device to the said network, a step of despatching of an announcement message containing autodescription information describing the device destined for all the other devices connected to this network, a step of despatching of an autodescripton information request message to all the other devices connected to this network, and a step of reception of a response message from each of the other devices of the network containing the autodescription information of this other device.

According to a particular embodiment of the invention the request message and the announcement message are merged.

According to a particular embodiment of the invention the autodescription information describing a device contains the address on the network of the device.

According to a particular embodiment of the invention the autodescripton information describing a device contains a unique global identifier, different from the address, identifying the device on the network.

According to a particular embodiment of the invention the autodescription information describing a device contains the characteristics of a software module making it possible to control this device.

According to a particular embodiment of the invention the announcement message is despatched by broadcasting over the network.

According to a particular embodiment of the invention the announcement message is despatched by multicasting on a predefined multicasting address to which the other devices must have subscribed.

The invention also relates to a device connectable to a network which possesses means for despatching an announcement message, containing autodescription information describing it, to all the other devices in the network, means for despatching a message for requesting autodescripton information to all the other devices in the network and means for receiving the response messages containing information describing each of the other devices of the network.

According to a particular embodiment of the invention the device comprises means making it possible to generate a unique global identifier, different from the address of the device, on the network.

According to a particular embodiment of the invention the device comprises means for despatching the announcement message by broadcasting over the network.

According to a particular embodiment of the invention, the device comprises means for despatching the announcement message by multicasting on a predefined multicasting address to which the other devices must have subscribed.

4. LIST OF DRAWINGS

The invention will be better understood, and other features and advantages will become apparent on reading the description which follows, the description making reference to the appended drawings in which.

5. DETAILED DESCRIPTION OF THE INVENTION

The exemplary embodiment of the invention which follows is set within the framework of the adaptation of HAVi to an IP type network, but it is obvious that the invention is not limited to this type of network and that it may be used to adapt HAVi to any other type of network. The invention can also be used within the context of a specification other than HAVi, should one seek to discover the devices connected to a network.

Figure 1:
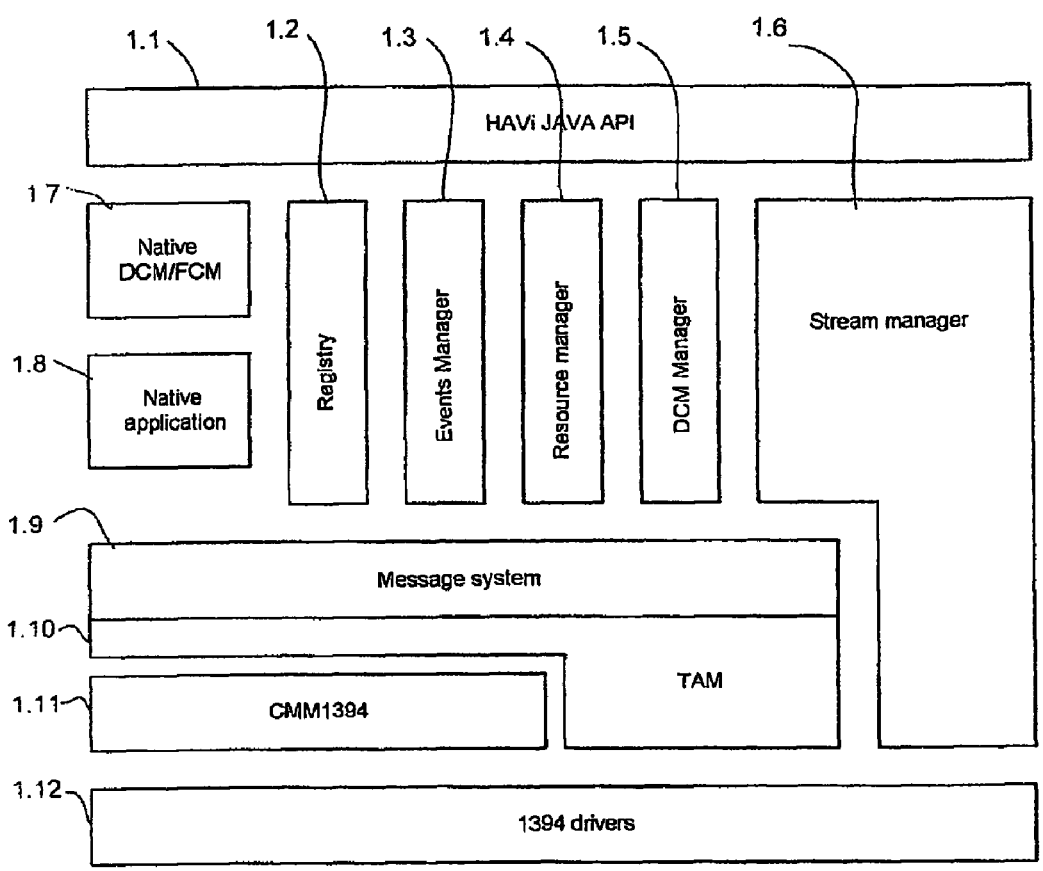
FIG. 1 represents the architecture of the HAVi stack as defined on a 1394 network.

FIG. 1 represents the architecture of the HAVi stack as defined in the HAVi specification on a network consisting of 1394 buses. The HAVi stack is programmable in JAVA via the API ("Application programming interface") 1.1. The stack of a device can comprise modules for controlling the device (DCM "Device Control Module") or modules for controlling functionalities of the device (FCM standing for "Function Control Module") 1.7. The stack can also comprise native modules 1.8. A register base 1.2 ("Registry") maintains a base of all the devices on the network. An event manager 1.3 is responsible for the transmission over the network of the events resulting from a change of state of a device. A resource manager 1.4 allows the sharing of resources and the scheduling of actions. A device control module manager 1.5 makes it possible to install and remove modules allowing the control of other devices on the network. A stream manager 1.6 makes it possible to manage the real-time transfer streams of the audio and video contents over the network. A messaging system 1.9 is responsible for the passing of messages between the various components of the system. A module for adaptation to the transport layer 1.10 (TAM standing for "Transport Adaptation Module") allows the assembly and fragmentation of the HAVi messages. The manager of the transmission medium 1.11 (CMM standing for "Communication Media Manager") allows the other elements of the system to use the transmission medium directly without involving the message manager. This is necessary, in particular to be able to implement non-HAVi device control modules where control relies on a proprietary protocol. The stream manger, the TAM or the CMM dialog with the drivers of the network 1.12, in this instance 1394.

Figure 2:
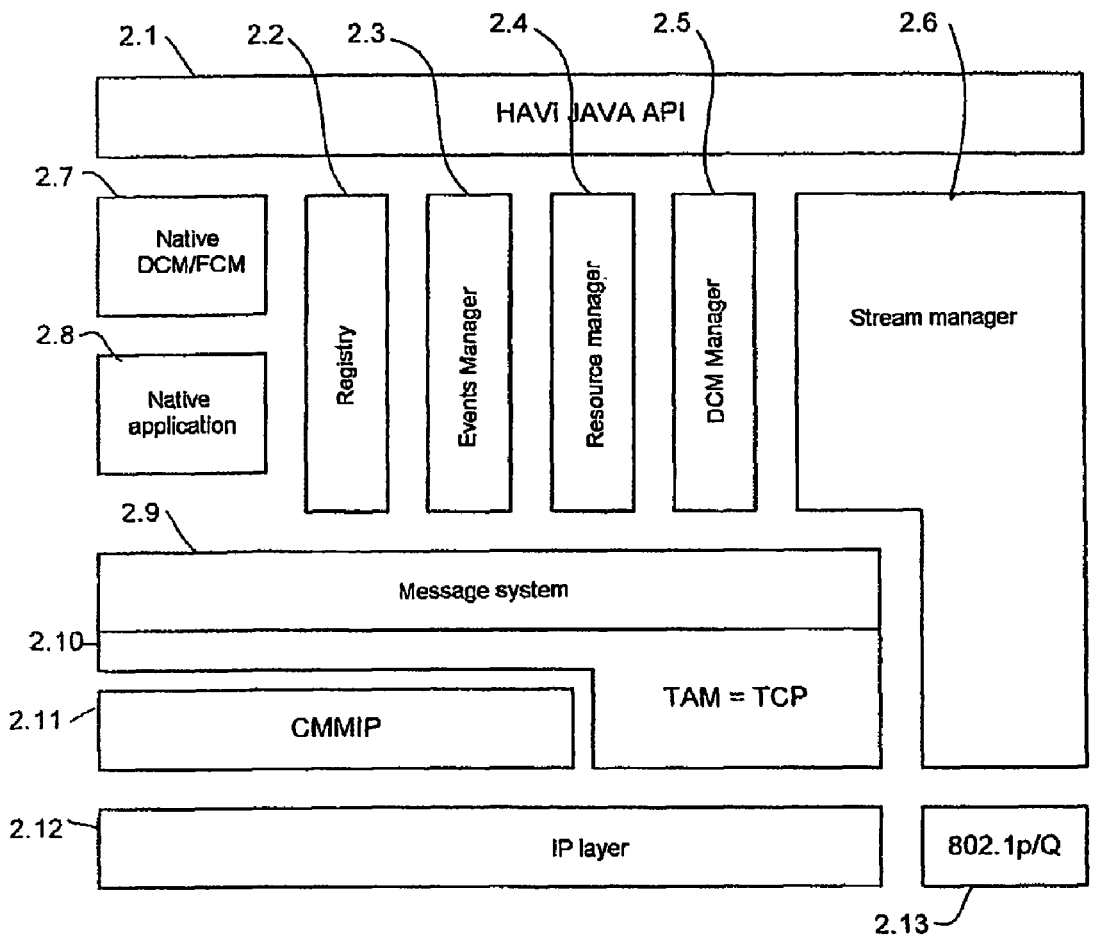
FIG. 2 represents the architecture of the HAVi stack as implemented in the exemplary embodiment of the Invention.

FIG. 2 represents the architecture of the HAVi stack in the context of the exemplary embodiment of the invention. Found therein are the same elements as in the previous figure with the exception of the transport layer adaptation module 2.10. Here we find the TCP protocol which acts as TAM. The transmission medium manager must be adapted to IP and no longer to 1394. We therefore have a CMMIP 2.11. These modules Interact with the IP layer 2.12. The stream manager for Ks part will interact with the 802.1p/Q 2.13 layer affording the quality of service over IP for stream exchange.

The HAVi specification defines a unique identifier on the network for a software component, this identifier is called the SEID standing for "Software Element Identifier". This identifier is coded on 80 bits and is composed of two distinct elements, a first identifier corresponding to a unique identifier of the device hosting the software component on the network. This identifier is on 64 bits and is called the GUID standing for "Global Unique Identifier". This GUID is defined by the IEEE 1394 standard to uniquely identify the 1394 devices, that is to say the EUI-64 of the 1394 component stored in the read only memory of any 1394 device. Let us recall that an EUI-64, as defined by the IEEE in its document "Guidelines for 64-bit Global Identifier (EUI-64™) Registration Authority", is composed of a 24-bit company identifier followed by a 40-bit extension.

The second element making up the SEID is a 16-bit Identifier making it possible to identify the component within the device which hosts it. By concatenating a unique identifier for the device on the network and an identifier of the component on the device it is thus possible to uniquely identify any software component within the HAVi network.

However, there is no equivalent 64-bit identifier on an IP network. On this network, there only exist 32-bit IP addresses in IP version 4 and 128-bit addresses in IP version 6, or even 48-bit MAC addresses when the network is an Ethernet network. A first idea is to construct the SEID by concatenating the natural identifier of the relevant network with an identifier local to the device, supplementing the latter to construct an SEID of 80 bits. In fact this solution does not operate in the case where a heterogeneous network were to connect, for example, a bus based on 1394 and another on IP. In this case, coexistence of an SEID constructed on the basis of a GUID of 64 bits and of a local identifier on 16 bits with others constructed, for example, on the basis of an IP address of 32 bits and of a local identifier of 48 bits, may lead to the non-uniqueness of the identifiers. Specifically, an SEID of 0xA9FE6410000000123456 corresponding to an IP address of 169.254.100.16 and a local identifier of 0x000000123456 may collide with an SEID composed of a GUID of 0xA9FE641000000012 and a local identifier of 0x3456. Hence, regardless of the type of network on which one wishes to manage HAVi, it is appropriate to keep the structure of the SEID as an identifier, the GUID, on 64 bits and a local identifier on 16 bits.

It is therefore necessary to find the means of creating GUIDs on the intended network that do not interfere with the standard GUIDs on 1394, hence with the EUI-64s of the IEEE. These EUI-64s are the concatenation of a company identifier on 24 bits identifying the company from which the device originates and of a 40-bit extension managed by the company from which the EUI-64 originates and which is responsible for its uniqueness within the whole set of identifiers originating from it. The company identifiers being managed in a centralized manner by the IEEE registration authority. A first means of constructing such a GUID on an IP version 4 network is to take 0xFFFFFFFE concatenated with the IP address in question on 32 bits. Since the value 0xFFFFFF must not be allocated by the IEEE as company identifier, this method of constructing the GUID will certainly produce identifiers that will not collide with the GUIDs formed of an EUI-64.

Another way of doing things is to use the method advocated by the IEEE for the construction of an EUI-64 by extending a 48-bit MAC address, that is to say to choose a construction of the form 0xccccccFFFFeeeeee where 0xccccccc represents the part identifying the company in the MAC address and 0xeeeeee the extension in the MAC address. In this case, non collision with EUI-64s is ensured through the fact that the IEEE restricts the allocation of 40-bit extensions which must not commence with 0xFFFFFF, nor with 0xFFFFFE, which are respectively reserved as mark of an extension of a MAC48 address and of an EUI-48.

The following table summarizes the various formats of addresses or identifiers mentioned in the previous paragraphs.

| | | | |
|---|---|---|---|
| MAC-48 Address | { | | |
| | | company_id | 24 bits |
| | | extension | 24 bits |
| | } | | |
| EUI-48 | { | | |
| | | company_id | 24 bits |
| | | extension | 24 bits |
| | } | | |
| EUI-64 | { | | |
| | | company_id | 24 bits |
| | | extension | 40 bits |
| | } | | |
| SEID | { | | |
| | | GUID | 80 bits |
| | | Local_id | 16 bits |
| | } | | |

In the case of the IP version 6 network, the problem is slightly different. Specifically, this version of IP advocates addresses on 128 bits. The IP version 6 addresses are composed of two parts of 64 bits, the prefix and the identifier of the interface. This identifier is designed to correspond to an EUI-64 apart from the "u/l" bit in the company identifier. However, this difference does not jeopardise the uniqueness of the EUI-64. It is therefore possible to take the last 64 bits of the IP version 6 address directly so as to constitute the GUID of the HAVi device.

In the case of an IP version 4 and IP version 6 bicompatible device, we shall take the identifier defined by the IP version 6 address of the device. For a device starting up on the network by following IP version 4 and subsequently becoming version 6 compatible, the device will be regarded as being disconnected and reconnected, hence it will be allocated an identifier arising from its version 6 address.

When a HAVi device connects up to the network, it enters a network discovery phase allowing it to ascertain the other devices available on this network. In the conventional case where the underlying network is a 1394 bus, the bus reset phase brought about by the plugging in of a new device terminates with the obtaining by each device of the list of the addresses on the bus of each of the other devices connected to the bus. Thereafter, the new device can interrogate each device of the network so as to read in its read only memory the autodescription data of the device (SDD standing for <<Self Describing Device>>). Specifically, the HAVi specification requires each device to possess addressable data such as these, following the IEEE 1212 standard.

The problem therefore arises of transposing this discovery phase over to a network other than a 1394 bus. On the one hand we have no natural mechanism allowing a device of the network to retrieve the list of addresses of all the devices connected to the network. On the other hand, it is not generally possible to go and read from the memory of a remote device as is done when following the IEEE 1212 standard. The IP network, by contrast, possesses a broadcasting mechanism which makes it possible to despatch a message over the network with no specific recipient, each device connected receiving the said message. Each device connecting up to the network can therefore despatch a broadcast message over the network to announce itself.

A multicast mechanism also exists. This mechanism defines multicast addresses. Through this mechanism any packet sent towards this multicast address is received by any device that has subscribed to this broadcasting address. It is therefore possible to define a known multicast address dedicated to the announcing on the network of the HAVi devices. Each device connecting up to the network announces itself at this multicast address and all the other devices of the network that have subscribed to this dedicated address will receive the announcement.

Figure 3:
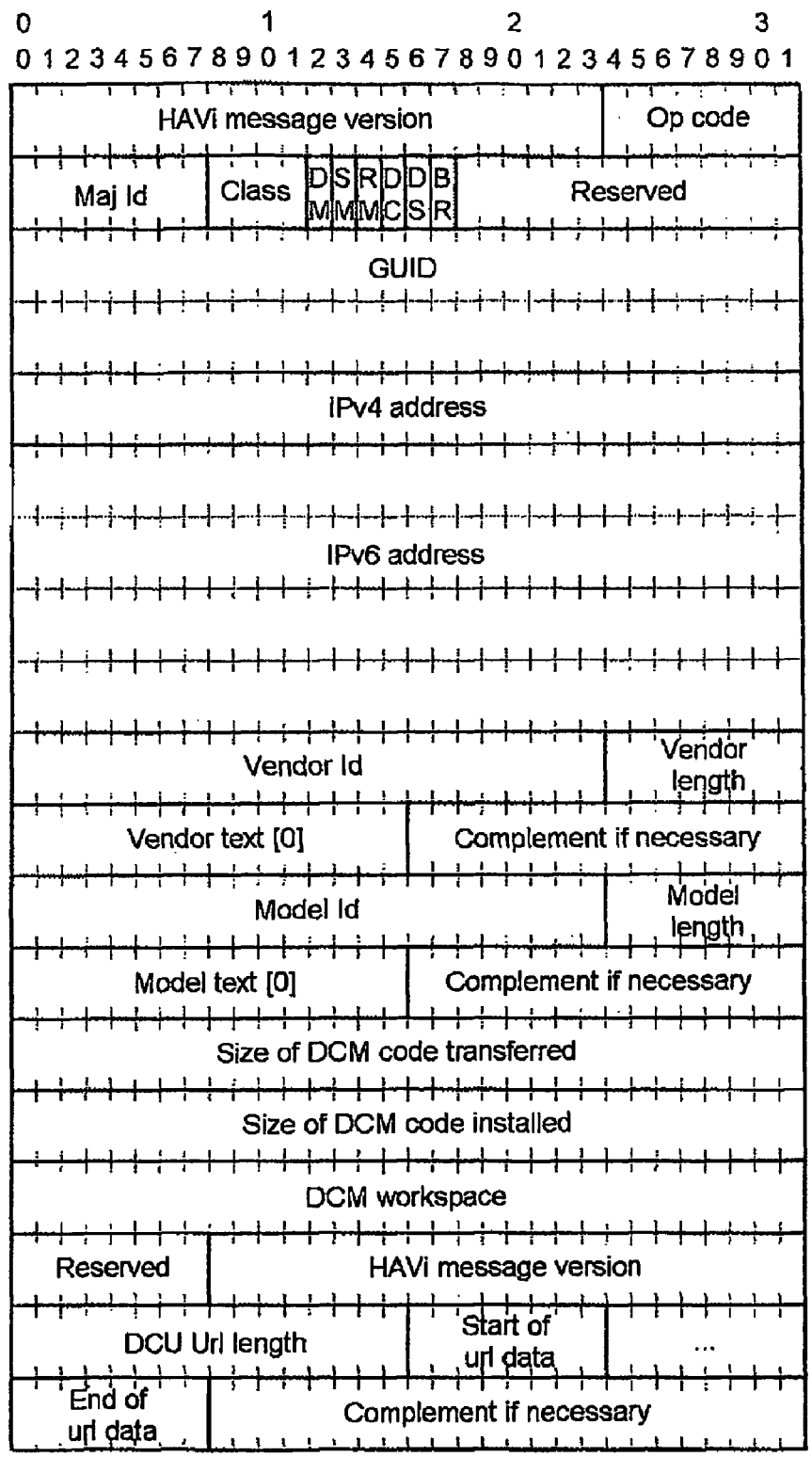
FIG. 3 represents the format of the announcement packet as defined in the exemplary embodiment of the Invention.
Figure 4:
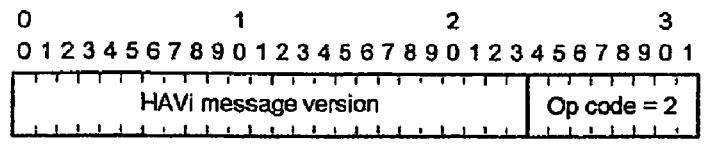
FIG. 4 represents the format of the SDDs request packet as defined in the exemplary embodiment of the invention.

This message may moreover comprise the autodescription information contained in the SDD, in this way each device of the network can update its tables with its information as if it had gone to read it from the memory of the device. This message can for example use the UDP over IP protocol. In this way, we benefit from the UDP error detection. It is also possible to define a UDP port dedicated to HAVi. An example of this information is given in FIG. 3. Found therein are:

HAVi message version: as in the HAVi 1.1 specification, it gives the version of the HAVi system supported by this device.
The first byte is reserved and must be 0x00
The second byte is the major version number
The third byte is the minor version number
Opcode: the values are
  0: live
  1: exiting
  2: request
  3 to 255: reserved
Update identifier: an 8-bit field initialized to 0 and incremented each time a value changes in the message. This makes it possible to ascertain whether a change in the message has occurred without having to compare all the values.
Device class: defines the class of the device, may be:
  0b0000: reserved
  0b0001: basic audio video (BAV)
  0b0010: intermediate audio video (IAV)
  0b0011: full audio video (FAV)
  0b0100 to 0b1111: reserved
DM: This bit specifies for the IAV devices whether a DCM manager is implemented, must be set to 0 for a BAV device and to 1 for the FAV devices.
SM: This bit specifies for the IAV devices whether a stream manager is implemented, must be set to 0 for a BAV device and to 1 for the FAV devices.
RM: This bit specifies for the IAV devices whether a resource manager is implemented, must be set to 0 for a BAV device and to 1 for the FAV devices.
DC: This bit specifies for an IAV device whether a controller of interactions directed by the data, (DDI standing for "<<Data Driven Interaction>>") is implemented and for an FAV device whether a DDI controller and a level 2 user interface is implemented, must be set to 0 in the case of a BAV device.
DS: This bit specifies the status, active or inactive, of the device, in the case of a HAVi device on an IP network must be set to 1, since the fact of announcing itself on the network signifies that the device is active.
Br: this bit specifies whether the device Is a bridge.
GUID: the global unique device identifier of the device.
IPV4 address: the IP version 4 address of the device, must be set to 0 if it is not defined.
IPV6 address: The IP version 6 address of the device, must be set to 0 if it is not defined.
Vendor ID: Identifier of the vendor, defined in a global and unique manner by the IEEE, makes it possible to identify the manufacturer of the device;
Vendor length: specifies the length of the text identifying the vendor, each character being coded as a unicode on 16 bits.
Vendor text: Character string identifying the vendor, limited to 50 characters by the HAVi specification.
Model ID: identifies the device model, defined by the manufacturer of the device.
Model length: specifies the length of the text identifying the model, each character being coded as a unicode on 16 bits.
Model text: character string identifying the model, limited to 50 characters by the HAVi specification.

The following fields are available only for BAV devices. For IAV, FAV devices and BAV devices that do not provide this information and hence no DCM ("Device Control Module"), code unit, these fields must exist and must be set to zero as far as the "DCU URL size" field followed by two zero complement bytes.
DCU size: Size in bytes of the DCM code unit transferred.
DCU installed space: memory size required to install the unit without counting the workspace.
DCU workspace: estimate of the workspace required by the code unit
DCU URL size: size in bytes of the address of the DCU.
URL data: the character string forming the address where the code unit is found.

We have just seen how a device connecting up to the network announced itself to the other devices of the network. It is now necessary to define how this device discovers the other devices of the network. To do this, the device despatches an enquiry over the network. This enquiry may be despatched in the same manner as the announcement message described previously, that is to say by broadcasting or multicasting with a known address. This address may be the same as that defined for the announcement messages or another specific to this message. Each device of the network which receives this enquiry responds with a unicast message. This response message is therefore despatched only to the newly connected device. This response message must contain, as the announcement, the autodescription information normally read from the SDD. This response message may take the same form as the announcement message with the opcode field set to 0 for "live". The format of the request may be the format described in FIG. 3 where the "HAVi message version" field has the same meaning as in the announcement and where the "opcode" field is set to 2. It is also conceivable for the response message to be despatched directly in response to the announcement message upon the connection of the new device to the network. In this case the announcement messages and the request messages are merged.

Figure 5:
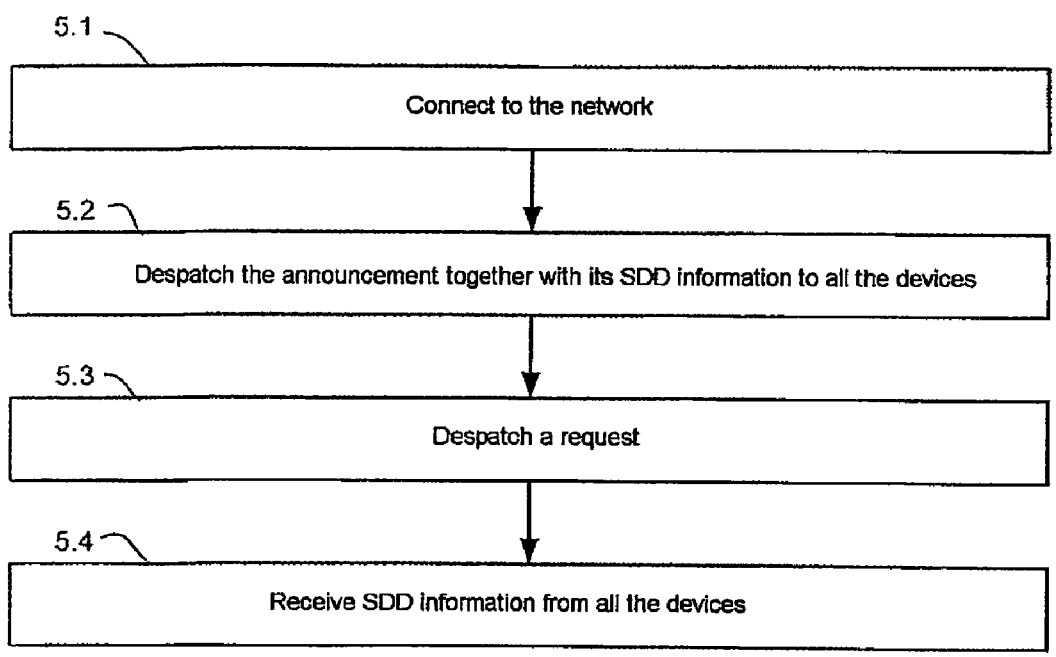
FIG. 5 represents the steps of the phase of discovery of the network within the context of the exemplary embodiment of the invention.

The steps of the phase of discovery of the network by a device connecting up to this network are summarized in FIG. 5. The device connects up to the network, step 5.1. Once connected, it despatches an announcement message containing the autodescription Information relating to it destined for the devices already connected to the network, step 5.2. This autodescription information is the counterpart of the information contained in the SDD of the 1394 devices. Once the device has announced itself over the network, it despatches a request destined for all the other devices 5.3 by broadcast or multicast. The other devices of the network respond to this request by despatching response messages containing the autodescription information relating to them to the sender of the request, step 5.4.

The HAVi specification provides in its architecture for the presence of a communication media manager, CMM. The CMM is an entity dependent on the underlying network on which the HAVi specification used. This manager affords an interface to the network so that HAVi components can interact with devices that could not be completely monitored through exchanges of HAVi messages. By affording an interface allowing the direct use of the underlying network, it is made possible for a HAVi module to drive any device on the network regardless of its mode of operation and the protocol that it uses, even proprietary. Another functionality afforded by this manager is of effecting the link between the global unique identifiers of the HAVi devices on the network (GUID) and their IP address. This manager also makes it possible to implement a mechanism of indications on the network. By virtue of this indications mechanism, it will be possible for a device to subscribe to indications sent by another device over the network. It will therefore be able to receive these indications in the form of messages and manage these subscriptions as will be seen in the description of the various functions constituting this manager. The subscription to these indications corresponds to the filtering of the IP packets received as a function of their origin and of the protocol over IP in which this packet participates. The manager adapted to the IP network (CMMIP) consists of the following functions:

Cmmip::GetGuidList
  Status Cmmip::GetGuidList(out sequence<GUID> guidList)
  guidList is the list of GUIDs of all the devices of the network.

This function makes it possible to retrieve the list of GUIDs of all the HAVi devices of the network.

| Cmmip::GetIPAddress |
|---|
| Status Cmmip::GetIPAdress(<br>In GUID guid,<br>Out sequence<IpAddress> ipAddressList) | guid is the GUID of the HAVi device.
InAddressList is the list of IP addresses of the device whose GUID is guid on the network. A device being able to have at most one IP version 4 address and one IP version 6 address.
The function returns the IP address of the device identified by its GUID.

| Cmmip::GetGuid |
|---|
| Status Cmmip::GetGuid(<br>in IpAdress ipAdress,<br>out GUID guid) | ipAdress is the IP address of the device
guid is the GUID of the device.
The function returns the GUID of the device identified by its IP address.

| Cmmip::Send |
|---|
| Status Cmmip::Send(<br>In Boolean useGuid,<br>In GUID guid,<br>In IpAddress ipAdress,<br>In uchar hopLimit,<br>In uchar upperProtocol,<br>In sequence<octet> data) | useGuid is a Boolean determining whether one is using the GUID or the IP address of the destination device to identify it.
guid is the GUID of the message destination device if useGuid is set to true.
ipAdress is the IP address of the message destination device if useGuid is set to false.
hopLimit is the maximum number of routers through which the message can pass before being destroyed.
upperProtocol is the code of the protocol contained in the IP packet, for example the code for UDP is 17.
data represents the series of bytes of the data that one wishes to despatch.
This function makes it possible to despatch an IP packet to a device identified either by its GUID, or by its IP address.

| Cmmip::EnrollIndication |
|---|
| Status Cmmip::EnrollIndication(<br>in Boolean useGuid,<br>in GUID guid,<br>in IpAdresse ipAdress,<br>in OperationCode opCode,<br>in uchar upperProtocol,<br>out Boolean conflicts) | useGuid is a Boolean determining whether one is using the GUID or the IP address of the destination device to identify it.

guid is the GUID of the message destination device if useGuid is set to true.

ipAdresse is the IP address of the message destination device if useGuid is set to false.

opCode is the operation code provided by the calling party, that is to say the value that the manager CMMIP will place in the "opcode" field of the notification message that he will despatch to the client.

upperProtocol is the protocol used by the indications that one wishes to receive.

conflicts has the value true if this subscription or ("enrolment") conflicts with another subscription, false otherwise.

This function allows a client of the manager CMMIP to subscribe to indications despatched by a device over the network using a given protocol. This mechanism makes it possible to filter the IP packets received by the interface of the device as a function of the sender and of the protocol used over IP. An IP address where all the bits are set to 1 (0xffffffff in IP version 4 or 0xffffffffffffffffffffffffffffffff in IP version 6) or a GUID where all the bits are set to 1 makes it possible to indicate that filtering with regard to the address of the sender is not desired and that it is desired to receive all the packets received that have the right protocol whatever the sender. The manager CMMIP will store the SEID of the client originating the Cmmip::EnrollIndication that it obtains from the message management system, thus allowing it subsequently when it receives an IP packet corresponding to this subscription to send back thereto the packet in question via a message by virtue of the CmmipIndication that we shall see later. One and the same IP packet may correspond to several subscriptions and will, in this case, be despatched to all the subscriber modules. The CMMIP is also responsible for updating the filters when a client is removed or when a device is unplugged from the network.

| Cmmip::DropIndication |
|---|
| Status Cmmip::DropIndication( in Boolean useGuid, in GUID guid, in IpAdresse ipAdress, in uchar upperProtocol) | useGuid is a Boolean determining whether one is using the GUID or the IP address of the destination device to identify it.

guid is the GUID of the message destination device if useGuid is set to true.

ipAdresse is the IP address of the message destination device If useGuid is set to false.

upperProtocol Is the protocol used by the indications that one no longer wishes to receive.

This function allows a client to desubscribe.

| <Client>::CmmipIndication |
|---|
| Status <Client>::CmmipIndication( in Boolean useGuid, in GUID guid, in IpAdresse ipAdress, in uchar upperProtocol, in ushort dataSize, in sequence<octet> indicationData) | useGuid is a Boolean determining whether one is using the GUID or the IP address of the destination device to identify it.

guid is the GUID of the message destination device if useGuid is set to true.

ipAddress is the IP address of the message destination device if useGuid is set to false.

upperProtocol is the protocol used by the indications that one wishes to despatch.

dataSize is the size of the data in bytes that one reckons to despatch.

indicationData, this is a sequence of bytes representing the actual data constituting the indication.

This function is used by the CMMIP to despatch to a client the message corresponding to an IP packet meeting the criteria of a subscription. On receipt of an IP packet the CMMIP tests the various subscriptions that are current for the clients present on the device. If the origin and the protocol of the IP packet correspond to the criteria fixed by the subscription of a client, the packet is despatched thereto by this function.

NewDevice
   void NewDevices(in sequence<GUID> guidList)
   guidList is the list of GUIDs of the new devices.

This event is generated by the CMMIP when one or more new devices announce themselves on the network. This event is delivered only locally on the device hosting the CMMIP, since because each HAVi device on the network possesses its own HAVi, a broadcast of the event is not necessary.

GoneDevices
   void GoneDevices(in sequence<GUID> guidList)
   guidList is the list of GUIDs of the devices that have been disconnected.

This event is generated by the CMMIP when one or more devices are disconnected from the network. The disconnection of a device from the network is detected either by the despatching of a message signalling the disconnection, or by the expiry of the time limits for the attempts to communicate with the device in question or during the discovery phase. In this case, the CMMIP despatches an event via the events manager signalling the GUIDs of the devices that have exited the network. This event is delivered only locally on the device hosting the CMMIP, since because each HAVi device on the network possesses its own CMMIP, a broadcast of the event is not necessary.

ChangedDevices
   void ChangedDevices(in sequence<GUID> guidList)
   guidList is the list of GUIDs of the devices that have changed IP address.

This event is generated by the CMMIP when one or more devices of the network have changed IP address. This change may stem from the detection of a collision between IP or other addresses. The CMMIP despatches an event via the events manager signalling the GUIDs of the devices that have changed IP address. This event is delivered only locally on the device hosting the CMMIP, since because each HAVi device on the network possesses its own CMMIP, a broadcast of the event is not necessary. The clients that so desire may, on receipt of this event, request via the Cmmip::GetIpAddress function the new address of the device or devices in question.

| GuidListReady |
|---|
| void GuidListReady( in sequence<GUID> guidList, in sequence<GUID> goneDevices, in sequence<GUID> newDevices, in sequence<GUID> changedDevices) | guidList is the list of GUIDs of all the HAVi devices connected to the network.

goneDevices is the list, possibly empty, of the GUIDs of the devices that have disappeared from the network during the reconfiguration.

newDevices is the list, possibly empty, of the GUIDs of the devices that have appeared on the network during the reconfiguration.

changedDevices is the list, possibly empty, of the GUIDs of the devices that have changed IP address during the reconfiguration.

This event is generated by the CMMIP when the list of GUIDs of the devices of the network is available. In fact, during a reconfiguration of the network, this list is no longer available via the Cmmip::GetGuidList function the time that the CMMIP completes the phase of discovery of the newly reconfigured network. This event is an event local to the device.

---

ProxyGuidCreated void ProxyGuidCreated(
 in GUID proxyGuid,
 in sequence<IpAddress> ipAddressList)

--- proxyGuid is the GUID created for the non-HAVi device.

ipAddressList is the list of IP addresses of the non-HAVi device.

When a HAVi device of the network wishes to interact with a non-HAVi device on the network (LAV standing for "Legacy Audio Video device") it can install a device control module (DCM) capable of managing this interaction. For the identification of this device in the HAVi world, it is necessary to allocate it a GUID knowing that a non-HAVi device does not possess such an identifier. The HAVi device wishing to act with it will therefore allocate it a GUID and will serve as relay in the HAVi world for this device addressed by this GUID (proxy). The creation of this relay GUID will be signalled on the network by this event, non local, signalling the relay GUID created and the IP addresses of the device thus identified.

The CMMIP module, thus implemented, therefore makes it possible to construct the list of GUIDs of the devices of the network and to effect the link between the GUIDs and the IP addresses of these devices. It also makes it possible to despatch IP messages over the network to a device known by its GUID or its IP address. It also offers the possibility of registering to receive IP messages, characterized by their origin and the protocol used over IP.

Figure 6:
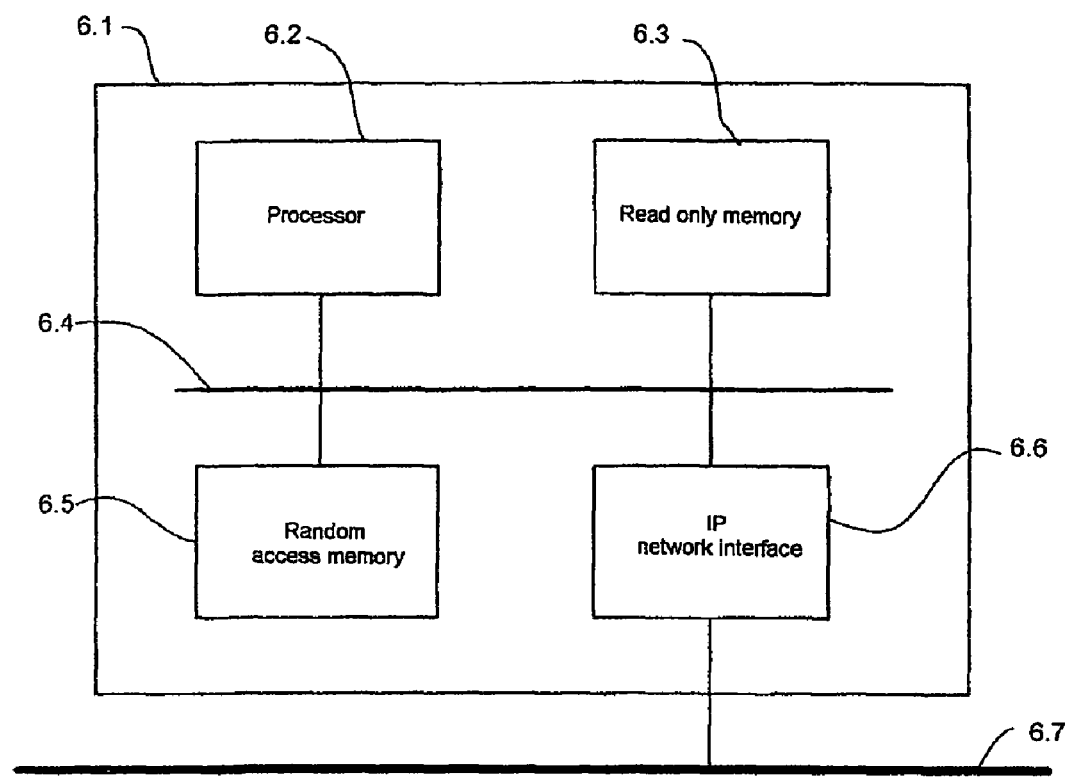
FIG. 6 represents the hardware architecture of a device supporting HAVi on an IP network.

A device 6.1 capable of supporting HAVi on an IP network possesses an architecture described in FIG. 6. It must possess an internal bus 6.4 linking a processor 6.2 which will execute the modules described by the HAVi stack. These programmes stored in the read only memory 6.3 of the device will be loaded into the random access memory 6.5 for execution. The exchanges with the IP network 6.7 will be effected via the IP network interface 6.6.

The invention claimed is:

1. Method of discovery, by a discovering device capable of connecting to a network, the network having connected devices, comprising the steps of:
 connecting the discovering device to the network, wherein the discovering device is configured to communicate with other devices connected to the network via a communications protocol that is different from a protocol used by the network;
 upon connection of the discovering device, dispatching, by the discovering device, an announcement message containing auto description information describing the discovering device destined for all the connected devices, said auto description information comprising characteristics of a software module making it possible for the connected devices to install the software module and to control the discovering device by means of the software module;
 upon connection of the discovering device, dispatching, by the discovering device, an auto description information request message to all the connected devices;
 receiving, by the discovering device, a response message from each of the connected devices containing auto description information of the connected devices and sent in response to the auto description information request message, said auto description information of each of the connected devices comprising characteristics of a software module making it possible for the discovering device to install said software module and control each of the connected devices by means of the software module.

2. Method according to claim 1, wherein the request message and the announcement message are merged.

3. Method according to claim 1, wherein the auto description information describing a device contains the address on the network of the device.

4. Method according to claim 1, wherein the auto description information describing a device contains a unique global identifier, different from the address, identifying the device on the network.

5. Method according to claim 1, wherein the announcement message is dispatched by broadcasting over the network.

6. Method according to claim 1, wherein the announcement message is dispatched by multicasting on a predefined multicasting address to which the other devices must have subscribed.

7. A discovering device connectable to a network, comprising:
 means for dispatching, upon connection, an announcement message, the announcement message containing auto description information describing the discovering device to all the other connected devices in the network, the auto description information comprising characteristics of a software module making it possible for all the other connected devices to install the software module and control the discovering device, the announcement message being dispatched to all the other connected devices in the network;
 means for dispatching, upon connection, a message for requesting auto description information to all the other connected devices in the network;

means for receiving the response messages containing information describing each of the other connected devices of the network sent in response to the auto description information request;

means for installing a software module of which characteristics are comprised in said information describing each of the other connected devices; and means for controlling said each of the other connected devices by said software module.

8. Device according to claim 7, wherein the auto description information describing a device contains the address on the network of the device.

9. Device according to claim 7, wherein the device comprises means making it possible to generate a unique global identifier, different from the address of the device, on the network.

10. Device according to claim 7, wherein the device comprises means for dispatching the announcement message by broadcasting over the network.

11. Device according to claim 7 which comprises means for dispatching the announcement message by multicasting on a predefined multicasting address to which the other devices must have subscribed.

* * * * *